(12) United States Patent
Gruber et al.

(10) Patent No.: US 6,868,698 B2
(45) Date of Patent: Mar. 22, 2005

(54) PLATE-SHAPED SHEARING KNIFE

(75) Inventors: Bernd Gruber, Pflach (AT); Hermann Reinhardt, Hohleborn (DE); Michael Schretter, Ehrwald (AT)

(73) Assignee: Plansee Tizit Aktiengesellschaft, Tirol (AT)

( * ) Notice: Subject to any disclaimer, the term of this patent is extended or adjusted under 35 U.S.C. 154(b) by 0 days.

(21) Appl. No.: 10/634,586

(22) Filed: Aug. 5, 2003

(65) Prior Publication Data

US 2004/0025659 A1 Feb. 12, 2004

Related U.S. Application Data

(63) Continuation of application No. 09/558,772, filed on Apr. 26, 2000, now Pat. No. 6,634,188.

(30) Foreign Application Priority Data

May 14, 1999 (AT) .............................................. 336/99 U

(51) Int. Cl.$^7$ ................................................. C03B 7/11
(52) U.S. Cl. ........................ 65/334; 65/332; 65/374.11; 65/374.12; 30/345; 30/350
(58) Field of Search ..................... 30/345, 350; 65/332, 65/334, 374.11, 374.12; 83/600, 623, 694, 697

(56) References Cited

U.S. PATENT DOCUMENTS

| 729,963 | A | 6/1903 | Rogers et al. .................. 65/207 |
| 852,932 | A | 5/1907 | Croskey |
| 859,117 | A | 7/1907 | Sagee |
| 1,017,870 | A | 2/1912 | Headley et al. ................ 65/226 |
| 1,362,785 | A | 12/1920 | Ferngren |
| 1,864,277 | A | 6/1932 | Tucker et al. .................. 65/170 |
| 2,812,619 | A | 11/1957 | Wythe .......................... 65/122 |
| 3,193,926 | A | 7/1965 | Honiss ......................... 30/194 |
| 3,264,077 | A | 8/1966 | Bishop .......................... 65/24 |
| 3,287,098 | A | 11/1966 | Stutske et al. ................ 65/133 |
| 3,607,208 | A | 9/1971 | Kapral ......................... 65/127 |
| 3,817,133 | A | 6/1974 | Romberg ....................... 65/133 |
| 6,634,188 | B1 * | 10/2003 | Gruber et al. ................. 65/334 |

FOREIGN PATENT DOCUMENTS

| DE | 23 04 009 | 10/1973 |
| JP | 63297538 | 12/1988 |

* cited by examiner

Primary Examiner—Sean Vincent
(74) Attorney, Agent, or Firm—Morgan & Finnegan, L.L.P.

(57) ABSTRACT

A plate-shaped shearing knife is provided made of hard metal for shearing off allotments of liquid glass. The hard metal of the shearing knife has a thermal conductivity of at least 85 W/mK. Next to a V-shaped or circular-shaped cutting region -2-, there are edge regions on both sides that do not flare out wedge-like, and have an average width b which is in a range of 5% to 30% of the total width of the shearing knife B in this section.

16 Claims, 2 Drawing Sheets

Cross-Section A-A

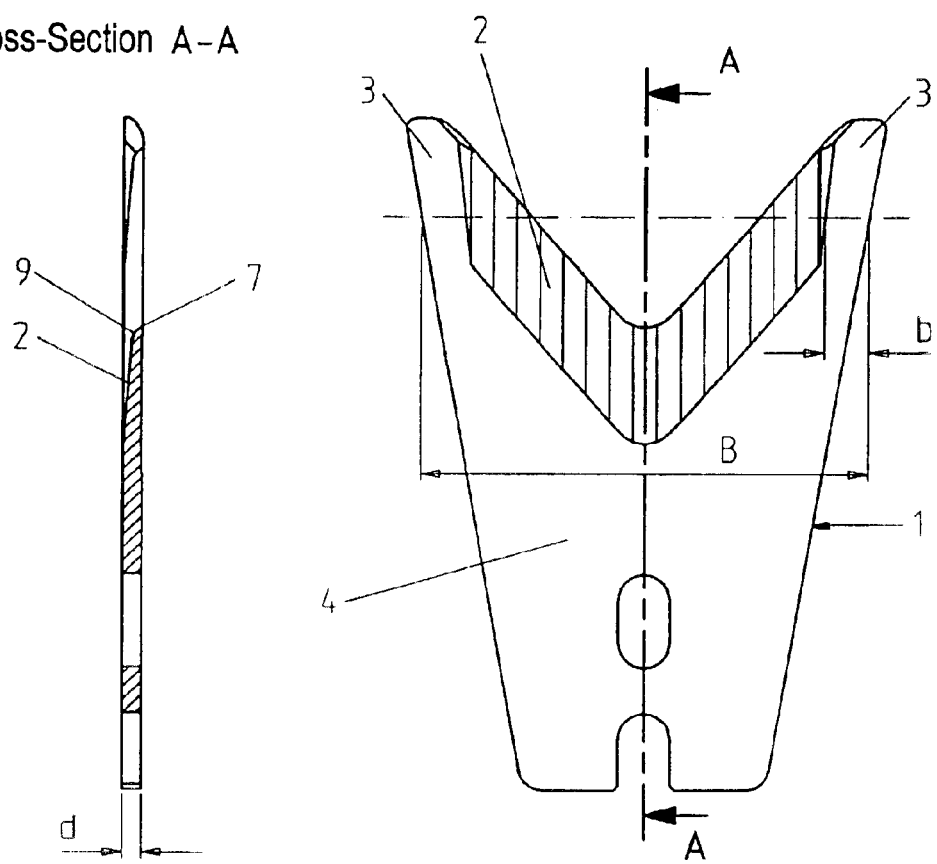

PLATE-SHAPED SHEARING KNIFE

Figure 3:
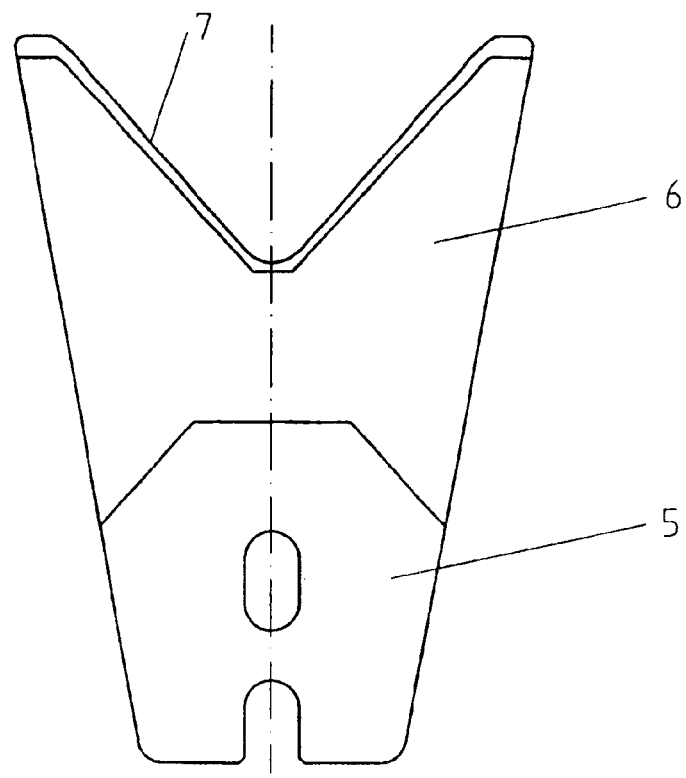

This is a continuation of application Ser. No. 09/558,772, filed Apr. 26, 2000, now U.S. Pat. No. 6,634,188.

BACKGROUND OF THE INVENTION

The present invention pertains to a plate-shaped shearing knife for shearing off allotments of liquid glass, the knife having a roughly V-shaped or circular-shaped cutting region and a wedge-shaped cross section with respect to its thickness.

Shearing knives of this kind are used in pairs in fully-automated systems, and use opposing movements to shear off glass allotments from a stream of liquid glass from a glass reservoir, these allotments can then be processed into glass bottles, container glass, video screens, and similar products.

In particular, when shearing off small allotments of glass, as occurs in the manufacture of glass bottles, container glass, or incandescent light bulbs, the shearing process takes place at a very high frequency, i.e., about 100 shearing steps per minute or more.

Because of this high frequency, the shearing knives are in direct contact with the glass melt over a relatively long period of time, and this glass melt has a temperature of between about 1100° C. and 1300° C. depending on the type of glass and the glass article to be manufactured. Thus, the knives are heated to temperatures of up to about 400° C. by the glass melt in spite of cooling of the knife by cooling emulsions. As a result, the wear of the shearing knife is accelerated.

OBJECT OF THE INVENTION

The purpose of the present invention is to create plate-shaped shearing knives of hard metal for shearing off allotments of liquid glass. Such knives heat up far less, even at very high shearing frequencies and thus are subject to a smaller amount of wear.

DETAILED DESCRIPTION OF THE INVENTION

According to this invention, the problem is solved in that the hard metal has a thermal conductivity of at least 85 W/m° K., and the shear knife has on both sides adjoining the wedge-shaped cutting region, an edge region having an average width b which is in the range of 5% to 30% of the total width of the shearing knife B.

In this manner, the heat absorption capacity of the shearing knife is increased and the dissipation of the quantity of heat absorbed by the knife to the cooling emulsion is accelerated so that over-heating of the shearing knife is reduced. Likewise, rigidity and thus strength against higher impact stresses is improved even at high cutting frequencies.

It is not practical to increase the dimensions of the shearing knife indefinitely to increase the thermal absorption of the shearing knife due to cost considerations-since hard metal is expensive and too large a knife takes up too much space. Also, the great accelerations and decelerations occurring at the high shearing frequencies make providing knives too large in size entirely impractical.

However, according to this invention, it turns out that even minor increases in volume of the shearing knife will provide considerable improvements by providing nonwedge-like sections adjoining the neighboring cutting edge region.

It has proven to be particularly advantageous when the thermal conductivity of the knife hard metal has a value in the range between 90 and 100 W/m° K.

An increase in thermal conductivity of the hard metal, as a rule, has a tendency to occur with the greatest possible tungsten carbide percentage, preferably with no supplemental carbides and rather small percentages of binder metal.

In addition, it is an advantage if the hard metal has a coarse grain with an average grain size of at least 2 $\mu$m.

A hard metal alloy that is particularly suitable for shearing knives for shearing of liquid glass allotments turns out to have 91 wt % of tungsten carbide and 9 wt % of cobalt.

This alloy is particularly resistant to the impact stresses occurring during operation of the shear knife.

An additional improvement with respect to the prevention of unacceptable heating of the shearing knife is attained in that the surface facing the glass reservoir beyond the glass contact region has a coating having relatively poor thermal conductivity and the opposing surface beyond the glass contact region has a coating with good thermal conductivity. Thus, on the one hand, too rapid heating of the shear knife by the glass melt can be avoided, and, on the other hand, the absorbed heat can be released to the cooling emulsion as quickly as possible.

In particular, aluminum oxide has proven valuable for the coating requiring poor thermal conductivity, and copper has proven valuable for the coating requiring good thermal conductivity.

Overall, to further reduce the settling of abrasion glass and, thus, to reduce the wear on the shearing knife, it is an advantage that the processing grooves at the cutting edge run essentially in the cutting direction of the shearing knife in the region of glass contact.

An additional means to avoid the increased wear on the shearing knife consists of providing the underside of the shearing knife with a 0.03 to 0.5 mm-deep recess that extends to a range of 1 to 8 mm from the outer tip of the cutting edge, and from there the recess flares out (diminishes in depth) conically to the outer tip of the cutting edge.

Due to this opening and exposure of the cutting edge, the surface area onto which the abrasion glass can settle will again be reduced, to prevent the quality at the cut surface of the glass from deteriorating.

The invention will be explained in greater detail below with reference to the figures.

Example

We have:

FIG. 1 A fundamental sketch of a shearing knife, according to this invention, shown in top view.

FIG. 2 The shearing knife, according to FIG. 1, showing cross section A—A.

FIG. 3 The underside of the shearing knife according to FIG. 1.

Figure 4:
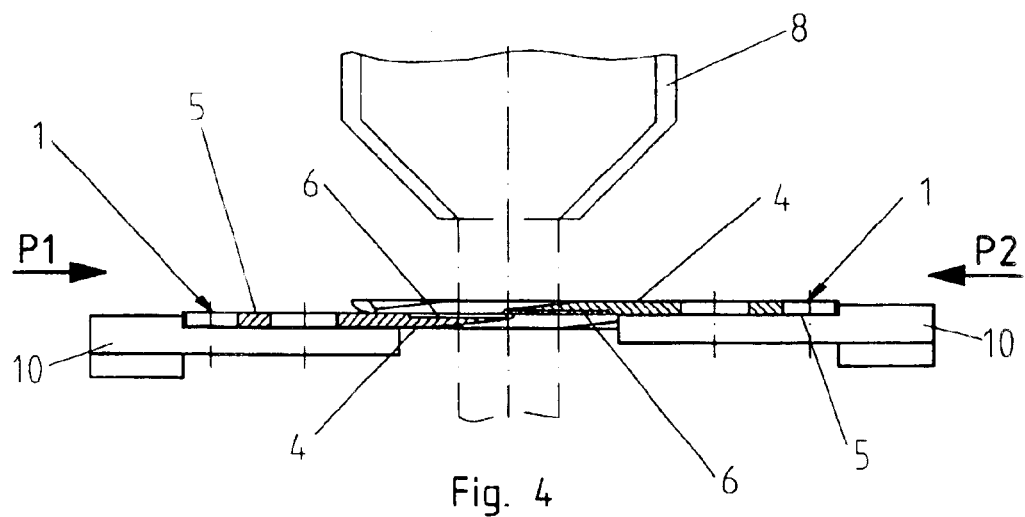

FIG. 4 A fundamental sketch of a shearing device with paired working shearing knives, according to this invention, presented in a side view.

The plate-shaped shearing knife -1-, according to this invention and as represented in FIGS. 1 to 3, is made of a hard metal alloy comprising 90 wt % of tungsten carbide and 9 wt % of cobalt. The top side -4- is of flat design except for the region -2- of the cutting edge. The V-shaped cutting region -2- has a wedge-shaped cross section with respect to the plate thickness d of the shearing knife. On both sides adjoining this cutting region -2-, the shearing knife -1- has an edge region -3-, that is not wedge-shaped, and flares out.

This edge region -3- is dimensioned so that its average width b, viewed with respect to the total cutting region -2-, amounts to about 15% of the total shearing knife width B in this shearing knife section. On the underside -5- (FIG. 3), the shearing knife has a recess -6- that extends to the cutting edge -7- such that the cutting edge is exposed. The wedge-shaped cutting region -2- transitions from a heavily inclined surface -9-(FIG. 2), or from a transition radius, directly into the cutting edge -7-. In the grinding process for making the cutting edge the surface grooves are made to run in the cutting direction in the region of the wedge-shaped, flared cutting region -2-.

The shearing device, according to FIG. 4, comprises two laterally arranged shearing arms -10- which move toward and away from each other at an adjustable cutting speed. There is a shearing knife -1- with V-shaped cutting region -2-, according to this invention, provided for each of these shearing arms -10- such that the V-shaped cutters are located opposite each other. The shearing knife -1- of the right shearing arm -10- in FIG. 4 is positioned somewhat higher, and slides with a freeplay of 0.03 mm to 0.08 mm in the cutting direction P2 across the somewhat lower-positioned shearing knife -1- of the left shearing arm -10- with the cutting direction P1. The shearing knife -1- of the right shearing arm -10- has its top side -4- facing the glass reservoir -8-, and this side is provided with a low thermal conductivity coating of aluminum oxide. At its underside -5- (FIG. 3) with the recess -6-, which is contacted by the cooling emulsion, this shearing knife -1- is provided with a coating of copper that has good thermal conductivity properties.

The shearing knife -1- of the left shearing arm -10-, however, has the surfaces of its side -5- and the recess -6- facing the glass reservoir -8- provided with the poor thermal conductivity coating of aluminum oxide. At its other side, which is exposed to the cooling emulsion, this knife features a good thermally conductivity coating of copper. In this manner a delayed heat absorption from the glass melt and also an accelerated heat release to the cooling emulsion is achieved such that the temperatures of the shearing knife will fluctuate in practice between about 100° C. to 200° C.

What is claimed is:

1. A plate-shaped shearing knife for shearing off allotments of liquid glass, said knife having a plate thickness and being comprised of a hard metal and having a roughly V-shaped or circular-shaped cutting region comprised of said hard metal, said cutting region having a wedge-shaped cross section with respect to said plate thickness of said shearing knife, said hard metal having a thermal conductivity of at least about 85 W/m° K., said shearing knife having on both sides of said cutting region, edge regions not having a wedge-shaped cross section, each edge region having an average width in the range of 5% to 30% of the total width of said shearing knife, said wedge-shaped cross section having a heavily inclined surface, said heavily inclined surface including a transition radius, said transition radius transitioning directly into said cutting edge.

2. A plate-shaped shearing knife according to claim 1, wherein said thermal conductivity of said hard metal is in a range between 90–100 W/m° K.

3. A plate-shaped shearing knife according to claim 1 wherein the average grain size of the hard metal is at least 2 $\mu$m.

4. A plate-shaped shearing knife according to claim 1 wherein said hard metal is comprised of 91 wt % of tungsten carbide and 9 wt % of cobalt.

5. A plate-shaped shearing knife according to claim 1 further having a surface outside of a glass contact region adapted to be directed toward a glass reservoir, said surface having a coating of poor thermal conductivity, said knife further having an opposing surface outside of the glass contact region having a coating with good thermal conductivity.

6. A plate-shaped shearing knife according to claim 5, wherein the coating with poor thermal conductivity is comprised of aluminum oxide and the coating with good thermal conductivity is comprised of copper.

7. A plate-shaped shearing knife according to claim 1, further having grooves running in a cutting direction of the shearing knife in a region of glass contact.

8. A plate-shaped shearing knife according to claim 1 wherein a side of the shearing knife has a 0.03 to 0.5 mm-deep recess that extends to a range of 1 to 8 mm from a tip of said cutting edge, and from there flares out conically to said tip of said cutting edge.

9. A plate-shaped shearing knife for shearing off allotments of liquid glass, said knife having a plate thickness and being comprised of a hard metal and having a roughly V-shaped or circular-shaped cutting region comprised of said hard metal, said cutting region having a wedge-shaped cross section with respect to said plate thickness of said shearing knife, said hard metal having a thermal conductivity of at least about 85 W/m° K., said shearing knife having on both sides of said cutting region, edge regions not having a wedge-shaped cross section, each edge region having an average width in the range of 5% to 30% of the total width of said shearing knife, said wedge-shaped cross section having a heavily inclined surface, said heavily inclined surface including a transition radius, said transition radius transitioning into said cutting edge through a portion of said heavily inclined surface disposed between said transition radius and said cutting edge.

10. A plate-shaped shearing knife according to claim 1, wherein said thermal conductivity of said hard metal is in a range between 90–100 W/m° K.

11. A plate-shaped shearing knife according to claim 1 wherein the average grain size of the hard metal is at least 2 $\mu$m.

12. A plate-shaped shearing knife according to claim 1 wherein said hard metal is comprised of 91 wt % of tungsten carbide and 9 wt % of cobalt.

13. A plate-shaped shearing knife according to claim 1 further having a surface outside of a glass contact region adapted to be directed toward a glass reservoir, said surface having a coating of poor thermal conductivity, said knife further having an opposing surface outside of the glass contact region having a coating with good thermal conductivity.

14. A plate-shaped shearing knife according to claim 5, wherein the coating with poor thermal conductivity is comprised of aluminum oxide and the coating with good thermal conductivity is comprised of copper.

15. A plate-shaped shearing knife according to claim 1, further having grooves running in a cutting direction of the shearing knife in a region of glass contact.

16. A plate-shaped shearing knife according to claim 1 wherein a side of the shearing knife has a 0.03 to 0.5 mm-deep recess that extends to a range of 1 to 8 mm from a tip of said cutting edge, and from there flares out conically to said tip of said cutting edge.

* * * * *